United States Patent
Hazlewood et al.

(10) Patent No.: US 9,684,565 B2
(45) Date of Patent: *Jun. 20, 2017

(54) PLURAL ARCHITECTURE MASTER DATA MANAGEMENT

(71) Applicant: International Business Machines Corporation, Armonk, NY (US)

(72) Inventors: Stephanie J. Hazlewood, Toronto (CA); Mohammad Khatibi, Richmond Hill (CA); Lan Luo, Markham (CA); Susanna W. Tai, Markham (CA); Amira N. Taiyab, Thornhill (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/042,312

(22) Filed: Feb. 12, 2016

(65) Prior Publication Data
US 2016/0162561 A1    Jun. 9, 2016

Related U.S. Application Data

(63) Continuation of application No. 14/300,310, filed on Jun. 10, 2014, now Pat. No. 9,298,729, which is a (Continued)

(51) Int. Cl.
*G06F 17/30* (2006.01)
*G06F 11/14* (2006.01)

(52) U.S. Cl.
CPC ...... *G06F 11/1451* (2013.01); *G06F 11/1446* (2013.01); *G06F 17/30174* (2013.01);
(Continued)

(58) Field of Classification Search
USPC .................................. 707/609, 624
See application file for complete search history.

(56) References Cited

U.S. PATENT DOCUMENTS

6,970,876 B2 * 11/2005 Hotti ................. G06F 17/30292
707/634
7,523,141 B2 * 4/2009 Makismenka .... G06F 17/30038
(Continued)

OTHER PUBLICATIONS

U.S. Appl. No. 13/873,086, filed Apr. 29, 2013, "Dynamic Assignment of Business Logic Based on Schema Mapping Metadata", 70 pages.
(Continued)

*Primary Examiner* — Kim Nguyen
(74) *Attorney, Agent, or Firm* — Robert C. Bunker; Edell, Shapiro & Finnan, LLC

(57) ABSTRACT

According to one embodiment of the present invention, a system for managing data within a plurality of data management architectures comprises at least one processor. The system persists an entity managed by a first data management architecture to a second data management architecture. The first data management architecture manages entity data within one or more data sources, while the second data management architecture manages persisted entities with data from the one or more data sources within a common repository. A modification to data of the persisted entity is detected within the one or more data sources, and the modified data is synchronized with the persisted entity in the repository of the second data management architecture. Embodiments of the present invention further include a method and computer program product for managing data within a plurality of data management architectures in substantially the same manner described above.

6 Claims, 7 Drawing Sheets

Related U.S. Application Data continuation of application No. 14/070,029, filed on Nov. 1, 2013, now Pat. No. 9,298,727.

(52) U.S. Cl.
CPC .. *G06F 17/30368* (2013.01); *G06F 17/30575* (2013.01); *G06F 17/30581* (2013.01)

(56) References Cited

U.S. PATENT DOCUMENTS

| | | | |
|---|---|---|---|
| 8,161,010 | B2 | 4/2012 | Weissman et al. |
| 8,204,922 | B2 | 6/2012 | Rangadass |
| 8,327,419 | B1 | 12/2012 | Korablev et al. |
| 8,380,749 | B2 | 2/2013 | Kowalski |
| 8,380,787 | B2 | 2/2013 | Anand et al. |
| 8,392,363 | B2 * | 3/2013 | Rangadass ........ G06F 17/30563 707/608 |
| 8,429,220 | B2 | 4/2013 | Wilkinson et al. |
| 8,438,238 | B2 | 5/2013 | Moser et al. |
| 8,458,226 | B2 | 6/2013 | Terwilliger |
| 8,484,015 | B1 | 7/2013 | Wolfram |
| 8,516,011 | B2 | 8/2013 | Hryniewicki |
| 8,538,958 | B2 | 9/2013 | Varadarajan |
| 8,566,318 | B1 | 10/2013 | Sacco |
| 8,566,321 | B2 | 10/2013 | Majumdar |
| 8,572,124 | B2 | 10/2013 | Behal et al. |
| 9,298,727 | B2 | 3/2016 | Hazlewood et al. |
| 2008/0288889 | A1 | 11/2008 | Hunt et al. |
| 2009/0228428 | A1 | 9/2009 | Dan et al. |
| 2012/0240183 | A1 * | 9/2012 | Sinha ................ H04W 12/08 726/1 |
| 2012/0246110 | A1 * | 9/2012 | Fischer ............ G06F 17/30592 707/602 |
| 2012/0303692 | A1 * | 11/2012 | Anand ............... H04L 67/1095 709/201 |
| 2013/0060825 | A1 * | 3/2013 | Farcasiu .......... G06F 17/30557 707/812 |
| 2013/0275369 | A1 * | 10/2013 | Hajare ............. G06F 17/30303 707/609 |
| 2015/0127606 | A1 | 5/2015 | Hazlewood et al. |
| 2015/0127672 | A1 | 5/2015 | Hazlewood et al. |
| 2015/0127690 | A1 | 5/2015 | Hazlewood et al. |
| 2016/0162367 | A1 | 6/2016 | Hazlewood et al. |

OTHER PUBLICATIONS

Arora, Guarav, "Different Styles of MDM Hub", http://hubdesignsmagazine.com/2008/01/30/different-styles-of-mdm-hub/, Hub Designs Magazine, Jan. 30, 2008, 2 pages.

FX Nicolas, "Back to Basics: Deciphering the MDM Hub Patterns", http://www.semarchy.com/semarchy-blog/backtobasics-mdm-hub-patterns/, Semarchy blog, Jul. 6, 2012, 2 pages.

Lawson, Loraine, "The MDM Silo Problem Vendors Are Ignoring", http://www.itbusinessedge.com/interviews/the-mdm-silo-problem-vendors-are-ignoring.html, IT Business Edge, Interview Feb. 15, 2013, 3 pages.

\* cited by examiner

PLURAL ARCHITECTURE MASTER DATA MANAGEMENT

CROSS-REFERENCE TO RELATED APPLICATIONS

This application is a continuation of U.S. patent application Ser. No. 14/300,310, entitled "PLURAL ARCHITECTURE MASTER DATA MANAGEMENT" and filed Jun. 10, 2014, which is a continuation of U.S. patent application Ser. No. 14/070,029, entitled "PLURAL ARCHITECTURE MASTER DATA MANAGEMENT" and filed Nov. 1, 2013, the disclosures of which are incorporated herein by reference in their entireties.

BACKGROUND

1. Technical Field

Present invention embodiments relate to data management, and more specifically, to master data management utilizing a combination of registry and centralized type architectures.

2. Discussion of the Related Art

Master Data Management (MDM) hubs have provided two approaches for the management of master data. Master data typically includes information pertaining to the operation of a business (e.g., customers, products, employees, materials, suppliers, etc.), and is generally stored in different data sources across that business. Each management approach addresses different implementation styles delineated primarily on the location where the ownership and management of master data occurs.

In a registry style (or virtual master data management) approach, source systems are the systems of record for providing master data, and changes to the master data are made through these existing source systems. A virtual master data management system gets loaded with records from the source systems that are associated with entities (e.g., person, corporation, company, organization, business, etc.), and determines similar or matching records that are associated with the same entity. The virtual master data management system stores only enough information to match and provide linkages between the similar and matching records for each of the entities. A trusted view of this information for an entity is subsequently provided to a user on demand from data within the source systems. Since a single view of an entity is not persisted to storage (of the virtual master data management system), modifications to master data are made via the source systems.

In a centralized style (or physical master data management) approach, master data from source systems is loaded into a single repository of a physical master data management system, and all information relevant to providing a single view of an entity is stored in that repository. Matching and collapsing of records across the source systems are performed, and a single view of the entity is typically persisted in the repository. The physical master data management system becomes the system of record for managing master data from that point forward.

However, these master data management styles are not always sufficient, and do not always fully accommodate the breadth of master data management requirements that commonly evolve over time with the growth and adoption of master data management techniques in support of the data governance strategies within an enterprise. This typically results in the proliferation and attempts to federate multiple master data management (MDM) hubs of the different styles, thereby incurring additional integration complexity, maintenance costs, and version alignment of supporting software.

BRIEF SUMMARY

According to one embodiment of the present invention, a system for managing data within a plurality of data management architectures comprises at least one processor. The system persists an entity managed by a first data management architecture to a second data management architecture. The first data management architecture manages entity data within one or more data sources, while the second data management architecture manages persisted entities with data from the one or more data sources within a common repository. A modification to data of the persisted entity is detected within the one or more data sources, and the modified data is synchronized with the persisted entity in the repository of the second data management architecture. Embodiments of the present invention further include a method and computer program product for managing data within a plurality of data management architectures in substantially the same manner described above.

BRIEF DESCRIPTION OF THE SEVERAL VIEWS OF THE DRAWINGS

Generally, like reference numerals in the various figures are utilized to designate like components.

DETAILED DESCRIPTION

Present invention embodiments manage master data in registry (or virtual), centralized (or physical), and co-existence styles within a common platform, and provide a framework for implementing style-agnostic services that facilitate the management of information stored according to each of these styles. Master data typically includes information pertaining to operation of a business (e.g., customers, products, employees, materials, suppliers, etc.), and is generally stored in different data sources across that business. However, present invention embodiments may manage any type of data pertaining to any type of objects (e.g., business or other entities or organizations, animate or inanimate objects, etc.).

A single application programming interface (API) enables the style of master data management (e.g., registry or virtual, centralized or physical, etc.) to be transparent to a service consumer. A subset of entity attributes is synchronized across the styles, and seamless, movement of master data records and/or more granular data attributes from one style of management to another is performed, typically from the registry style to the centralized and/or co-existence styles within the common platform. Master data records from a registry style system may be moved to a centralized style system in accordance with a set of rule-based criteria (e.g., size of entity membership, data completeness, etc.).

Present invention embodiments significantly reduce the need to federate out to multiple, independent master data management (MDM) systems in order to ascertain a complete picture of master data managed in different styles (e.g., registry and centralized styles). Further, present invention embodiments enable seamless movement of information from one master data management style to another, thereby avoiding significant extract, transform, load (ETL) efforts to move data from one system to another. Moreover, as the style of master data management changes over time, the application programming interfaces (APIs) used to access information remain the same.

Figure 1:
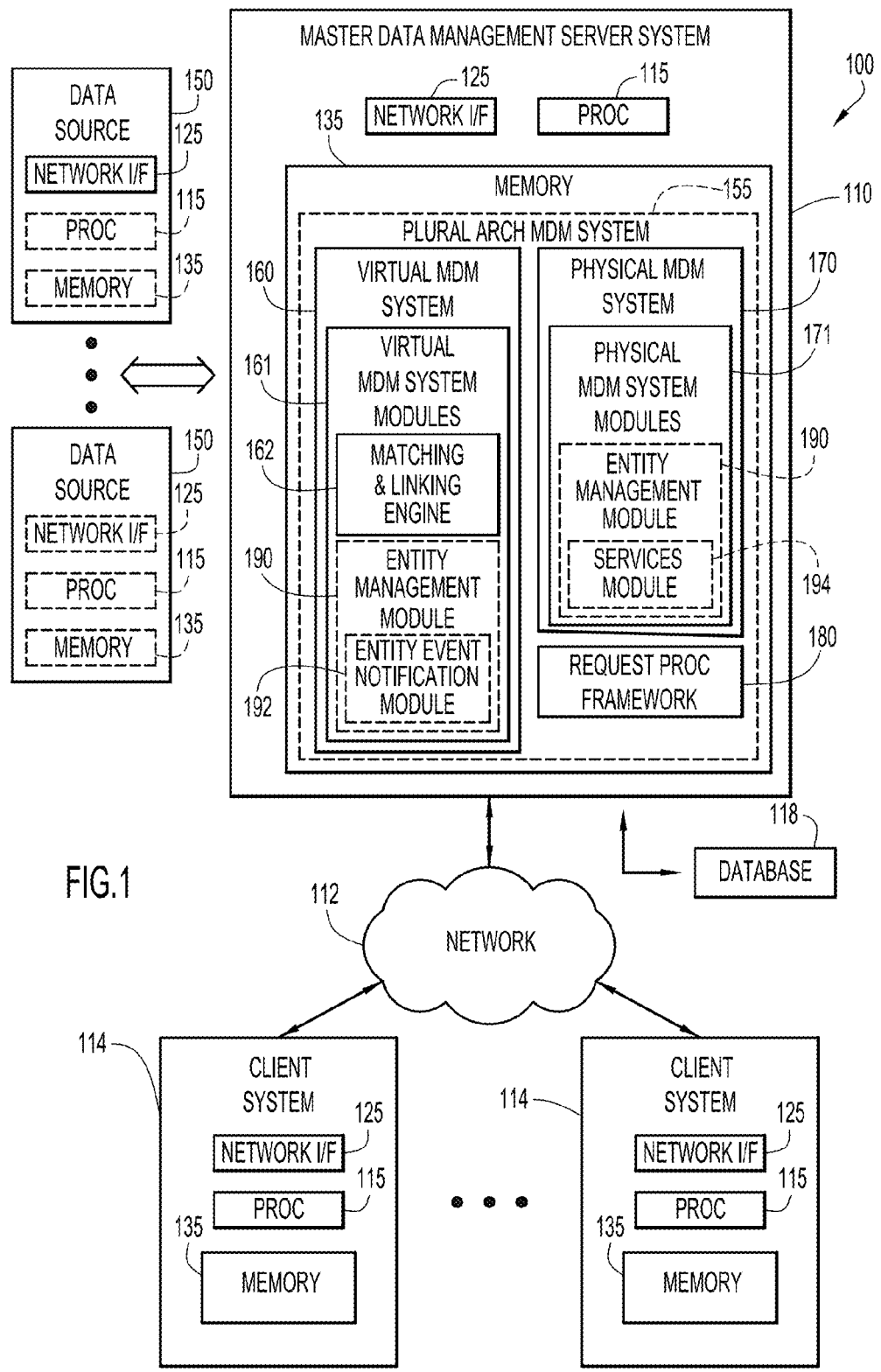
FIG. 1 is a diagrammatic illustration of an example computing environment of an embodiment of the present invention.

An example computing environment for use with present invention embodiments is illustrated in FIG. 1. Specifically, computing environment 100 includes a master data management server system 110, one or more client or end-user systems 114, and one or more data sources 150. The data sources may be implemented by any conventional or other storage structures or systems (e.g., server systems, databases, file systems, etc.) that contain records with master data pertaining to various entities (e.g., person, corporation, company, organization, business, etc.). However, data sources 150 may contain any type of data pertaining to any type of objects (e.g., business or other entities or organizations, animate or inanimate objects, etc.).

Master data management server system 110, client systems 114, and data sources 150 may be remote from each other and communicate over a network 112. The network may be implemented by any number of any suitable communications media (e.g., wide area network (WAN), local area network (LAN), Internet, Intranet, etc.). Alternatively, master data management server system 110, client systems 114, and data sources 150 may be local to each other, and communicate via any appropriate local communication medium (e.g., local area network (LAN), hardwire, wireless link, Intranet, etc.).

Master data management server system 110 provides a plural architecture master data management system 155 including a virtual (or registry type) master data management system 160 and a physical (or centralized) master data management system 170. Client systems 114 enable users to provide information to master data management server system 110 to configure, load and/or query the plural architecture master data management system. In particular, the master data management server system includes virtual master data management system 160 with virtual master data management system modules 161, physical master data management system 170 with physical master data management system modules 171, a request processing framework 180, and an entity management module 190. Virtual master data management system modules 161 implement virtual master data management system 160. In this type of system, data sources 150 provide and maintain master data, and changes to the master data are made through these data sources. The virtual master data management system modules process records from data sources 150 to determine records associated with the same entity (e.g., person, corporation, company, organization, business, etc.), and store only enough information to match and provide linkages between similar and matching records from the data sources for the various entities.

Virtual master data management system modules 161 include a matching and linking engine 162 to process records from the data sources and determine records associated with the same entity (e.g., person, corporation, company, organization, business, etc.). The determined records for an entity are linked, and this linkage information is stored and maintained by matching and linking engine 162. The records for an entity may be matched based on any conventional or other suitable matching or partial matching techniques (e.g., a quantity of the same or similar fields, matching scores, probabilistic matching, etc.).

Queries may be provided directly to the virtual master data management system from users/applications using the same APIs for virtual-owned data whose view is not fully persisted in the physical master data management system. In this case, a trusted view of entity information may be provided on demand by the virtual master data management system by utilizing the linking information to obtain records associated with the entity from the various data sources. Alternatively, the virtual master data management system may process queries for entities received by services of the physical master data management system as described below.

Physical master data management system modules 171 implement a centralized or physical master data management system. In this type of system, master data from data sources 150 is loaded into a single repository, and all information relevant to providing a single view of an entity is stored in that repository. Matching and collapsing of records across the data sources are performed, and a single view of an entity is persisted in the repository. Once the data is loaded in the repository, the data is utilized to process requests (e.g., updates, queries, etc.) or may be associated with information from another domain (e.g., product, account, etc.) that is being centrally managed. The virtual and physical master data management systems may be implemented by any conventional or other registry and/or centralized master data management systems (e.g., virtual and physical master data management systems of IBM INFOSPHERE Master Data Management (MDM), etc.).

A database system 118 may store various information for the data management (e.g., serve as the repository for the physical master data management system, metadata, data models of the virtual and physical master data management systems, mapping and linking information, etc.). The database system may be implemented by any conventional or other database or storage unit, may be local to or remote from master data management server system 110, and may communicate via any appropriate communication medium (e.g., local area network (LAN), wide area network (WAN), Internet, hardwire, wireless link, Intranet, etc.). The client systems may present a graphical user (e.g., GUI, etc.) or other interface (e.g., command line prompts, menu screens, etc.) to solicit information from users pertaining to the data management, and may provide reports including results (e.g., query results, configuration information, etc.).

Request processing framework 180 receives and processes requests for master data stored within the plural architecture master data management system as described below. This framework may be implemented by any conventional or other framework for processing data management requests (e.g., a request processing framework of IBM INFOSPHERE Master Data Management (MDM), etc.).

Entity management module 190 enables utilization of the virtual and physical master data management systems for data management, and controls movement, access, and retrieval of master data within these data management systems as described below. The entity management module includes an entity event notification module 192 and a services module 194. The entity event notification module provides notification of a modification to an entity within data sources 150 as described below. The entity event notification module 192 also provides extension capability so that business rules can be implemented to conditionally persist the entity view in physical MDM. That is, metrics could be taken to establish whether the content of a view is complete or clean enough to persist that view in physical MDM. This can be evaluated/calculated and a decision made in the event notification component. The services module provides various services for the plural architecture master data management system (e.g., persisting entities, querying entities, etc.) as described below. The entity management module may be external of, or fully or partially reside within, the virtual master data management and physical master data management systems in any fashion. For example, event notification module 192 may reside within virtual master data management system modules 161, while services module 194 may reside within physical master data management system modules 171.

Master data management server system 110, client system 114, and data sources 150 may be implemented by any conventional or other computer systems preferably equipped with a display or monitor, a base (e.g., including at least one processor 115, one or more memories 135 and/or internal or external network interfaces or communications devices 125 (e.g., modem, network cards, etc.)), optional input devices (e.g., a keyboard, mouse or other input device), and any commercially available and custom software (e.g., server/communications software, virtual master data management system modules, matching and linking engine, physical master data management system modules, request processing framework, entity management module, entity event notification module, services module, browser/interface software, etc.).

The modules of master data management server system 110 (e.g., virtual master data management system modules, matching and linking engine, physical master data management system modules, request processing framework, entity management module, entity event notification module, services module, etc.) may include one or more modules or units to perform the various functions of present invention embodiments described below. The various modules (e.g., virtual master data management system modules, matching and linking engine, physical master data management system modules, request processing framework, entity management module, entity event notification module, services module, etc.) may be implemented by any combination of any quantity of software and/or hardware modules or units, and may reside within memory 135 of the master data management server system for execution by processor 115.

Figure 2:
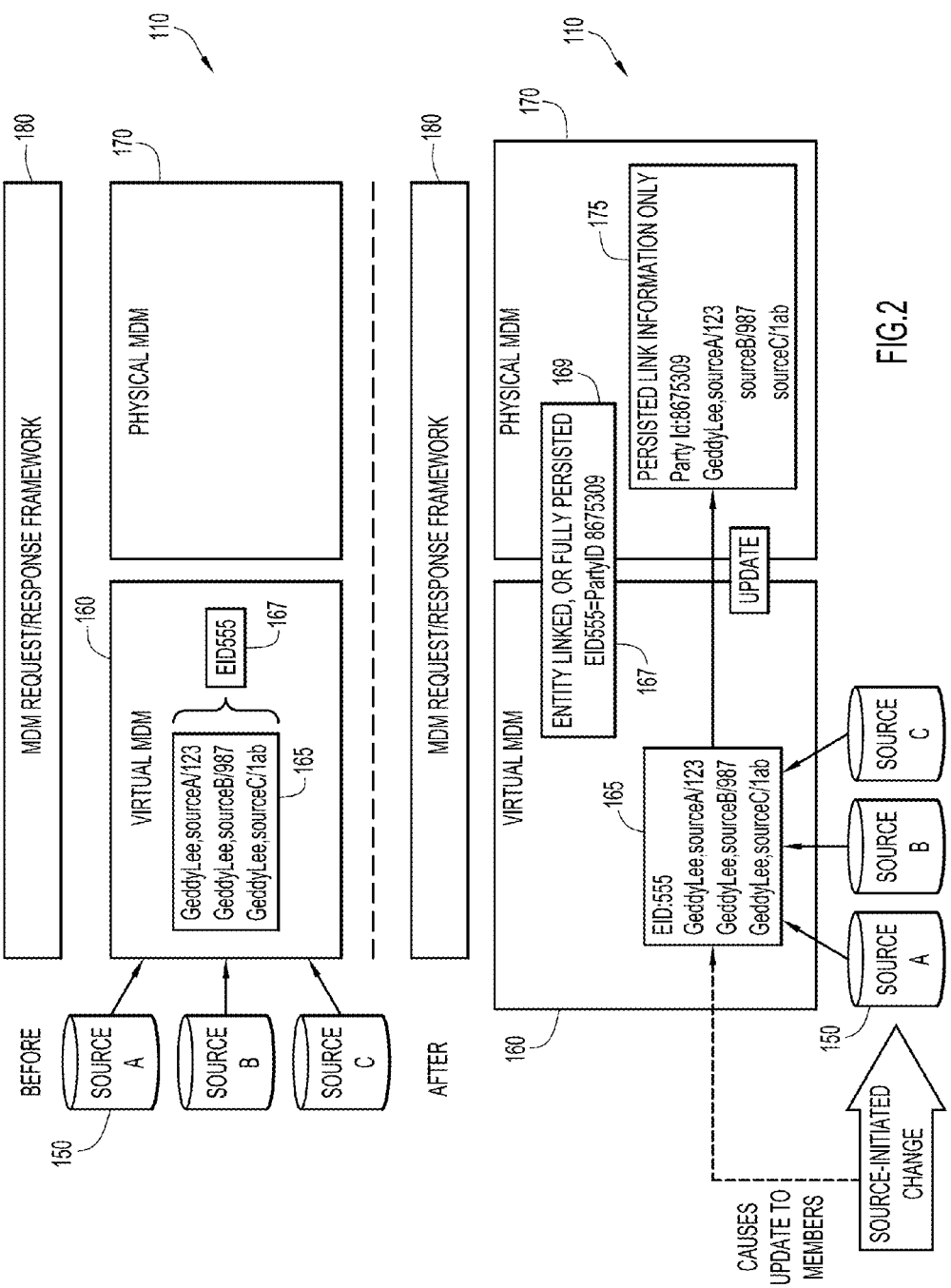
FIG. 2 is a diagrammatic illustration of a present invention embodiment migrating management of master data from a virtual master data management system to a physical master data management system.

Present invention embodiments may accommodate various scenarios employing virtual and physical master data management systems to manage master data. For example, master data may be currently managed in a virtual master data management system, but eventually some master data attributes are desired to be managed in a physical master data management system as illustrated in FIG. 2. Present invention embodiments enable the entity to be persisted from the virtual to the physical master data management system. By way of example, an entity 165 is managed by virtual master data management system 160 provided by master data management server system 110. The entity includes several data records from various data sources 150 that are linked, and is associated with an entity identification 167 to uniquely identify the entity within the virtual master data management system.

The entity may be persisted to physical master data management system 170 provided by master data management server system 110. In this case, a party identification 169 is generated for uniquely identifying the entity (or party) within the physical master data management system, and mapped to entity identification 167. The entity may be persisted in a registration mode, where link information 175 for the entity may be persisted in the physical master data management system. The link information is utilized to retrieve the entity records from the virtual master data management system. Alternatively, the entity may be persisted in a fully persisted mode, where the records for the entity are centrally stored in a repository of the physical master data management system (e.g., database system 118). In this case, the records for the persisted entity (or party) may be retrieved from the centrally stored data.

Various services are provided (e.g., by entity management module 190) that access the virtual and/or physical master data management systems to provide data in response to queries. Once the entity is persisted in the physical master data management system, client applications may be developed without having to face significant rework by leveraging centrally-managed, persisted attributes.

Another example scenario accommodated by present invention embodiments includes enhancing performance. For example, virtual master data management system 160 is initially employed. However, performance degradation occurs in response to retrieving some entities due to a large number of records or members (e.g., thousands, etc.) that belong to those entities. Retrieval may be enhanced by persisting a view of these large entities within physical master data management system 170.

Yet another example scenario accommodated by present invention embodiments includes conditional persistence. For example, virtual master data management system 160 is initially employed to manage and store entities. However, views of these entities may be conditionally persisted within physical master data management system 170 based on various criteria. By way of example, views of entities may be conditionally persisted in response to satisfying preconfigured or user-specified data characteristics (e.g., surpassing a particular level of data completeness or data quality, etc.).

Figure 3:
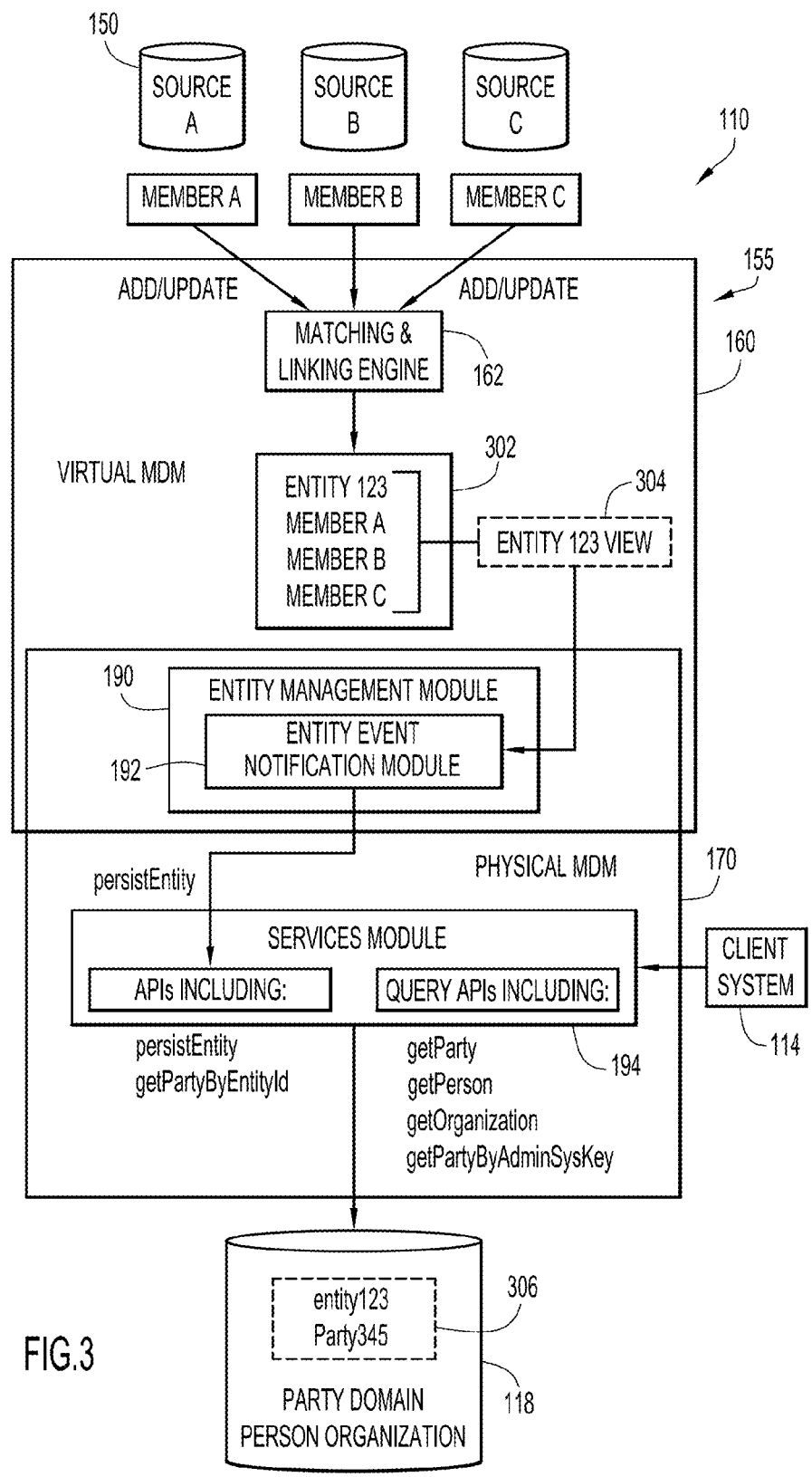
FIG. 3 is a flow diagram of a plural architecture master data management system of a present invention embodiment utilizing virtual and physical master data management systems to manage data.

A flow diagram of plural architecture data management system 155 is illustrated in FIG. 3. Initially, master data management server system 110 provides virtual master data management and physical master data management systems 160, 170 (e.g., via virtual master data management and physical master data management system modules 161, 171) as described above. Data can be created and/or managed, using a single set of services, in either data sources 150 (e.g., via the virtual master data management system) or in a repository (e.g., database system 118) that is centrally managed (e.g., via the physical master data management system).

Initially, linking and matching engine 162 of virtual master data management system 160 receives and processes records of master data from various data sources 150, and determines records associated with the same entity (e.g., person, corporation, company, organization, business, etc.). The determined records for an entity 302 are linked, and this linkage information is stored and maintained by matching and linking engine 162 within virtual master data management system 160.

Since master data is generally stored in different data sources 150, the master data may be duplicated and inconsistent. Thus, once records for the entities are matched and linked, a plurality of views may exist for the same entity with varying data. Accordingly, a view 304 for an entity is selected (e.g., by a user or automatically), and may be persisted to the repository of the physical master data management system (e.g., database system 118) via services (e.g., persistEntity, etc.) provided by services module 194 of entity management module 190. A party identification is generated for uniquely identifying the persisted entity (or party) within the physical master data management system, and mapped to an entity identification for the virtual master data management system. This associates the entity of the virtual master data management system with the corresponding party in the physical master data management system. Further, rules may be applied to conditionally persist certain entities based on a set of criteria (e.g., completeness, data quality of created entity view, entity size (e.g., number of members or records in the entity), etc.).

A persisted entity (or party) 306 may be represented in the physical master data management system in various manners. For example, the entity may be persisted in a registration mode, where a set of entity identifiers including an entity identification to identify the corresponding virtual representation (e.g., the entity within the virtual master data management system) and a corresponding set of unique record identifiers for the member records comprising the entity are stored in party records in the repository. The record identifiers uniquely identify a particular member record of an entity in a data source 150. The party records further include a status indicator that indicates the absence of a full persisted view of the entity in the repository of the physical master data management system.

The entity may further be persisted in a fully persisted mode, where the selected view of the entity is stored in party records within the repository of the physical master data management system. The party records include the status indicator indicating that a persisted view of the entity is stored in the repository. The status indicator may include any suitable values to indicate the persistence mode. By way of example only, a value of one indicates a registration mode of persistence, while a value of two indicates a full persistence.

The status indicator enables the plural architecture master data management system to conditionally derive the entity view from the virtual master data management system or from a stored representation in the repository of the physical master data management system. This provides several advantages. For example, generation of the selected view for large entities that include numerous (e.g., thousands, etc.) member records may take a significant amount of time. However, the time to retrieve this representation dramatically decreases by fully persisting the results of this view when first constructed. Further, a single application programming interface (API) can be used to provide services to retrieve entities for consuming systems regardless of whether the entities are virtually managed or physically managed in the plural architecture master data management system. This enables generation of consuming client applications early in the data management process and, as business needs evolve, the same set of application programming interfaces (APIs) remain functional for both virtual and physical master data management.

As critical data (e.g., used in matching and identifying duplicate records, etc.) changes in data sources 150 or in the central repository of the physical master data management system, entity event notification module 192 of entity management module 190 triggers the sharing of this information. For example, a modification (e.g., add, update, etc.) to data or an entity within data sources 150 may occur. Matching and linking engine 162 matches and links records of the data sources in order to determine if the selected view of the entity has changed. If the selected view has changed, entity event notification module triggers propagation of the modification to the persisted entity (or party) in the physical master data management system.

In the event data of a fully persisted entity (or party) is originally changed in the repository of the physical master data management system, the modification may be propagated to data sources 150 by the virtual master data management system via a notification mechanism that each of the source systems may subscribe to in order to consume the change consistently.

Queries for the plural architecture master data management system are received by request processing framework 180 from client systems 114, and handled by services module 194 of entity management module 190. The services module provides various application programming interfaces (APIs) or services (e.g., getParty, getPerson, getOrganization, getPartyByAdminSysKey, getPartyByEntityId, etc.) to retrieve data (e.g., person, entity, etc.) based on various criteria (e.g., system keys, entity identifications, etc.). The queries may be applied directly against the repository when entities are fully persisted therein. However, when a queried entity is persisted in a registration mode (e.g., storage of entity identifiers), the services module retrieves data for the queried entity from the virtual master data management system. In this case, the virtual master data management system utilizes the set of entity identifiers for the entity stored in the repository in order to retrieve data from data sources 150 and generate the selected view for the queried entity.

Figure 4:
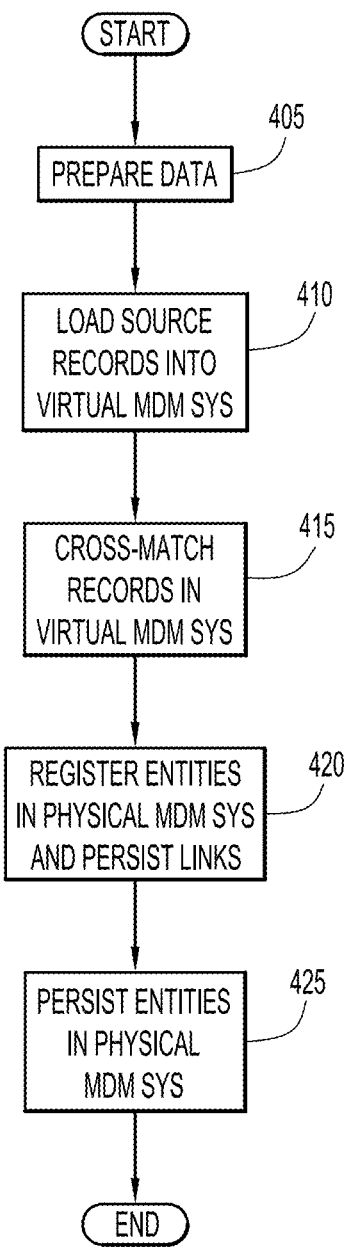
FIG. 4 is a procedural flow chart illustrating a manner in which data is loaded into the plural architecture master data management system according to an embodiment of the present invention.

A manner of loading data from data sources 150 into the plural architecture master data management system (e.g., via master data management server system 110 and virtual master data management system modules 161, physical master data management system modules 171, and entity management module 190) is illustrated in FIG. 4. Initially, configuration and other data are prepared at step 405. The preparation typically includes defining a data model for the virtual master data management system (or virtual data model), and mapping data fields (or entity attributes) of the virtual data model to corresponding data fields (or party attributes) of a data model of the physical master data management system (or physical data model). The physical data model employs various business objects (representing parties and party attributes), while the virtual model is based on entities (with entity attributes) that may be mapped to the business objects. The virtual and physical data models are typically maintained in database tables of database system 118 (FIG. 1), where the mapping provides associations between corresponding fields of database tables (for entities and parties) of the virtual and physical data models. The mapping may be initiated using a pre-defined physical data model, where the pre-defined model may be expanded to accommodate varying data requirements.

The mapping between the virtual and physical models further indicates the attributes of parties of the physical data model defined as business keys. Business keys are used to determine uniqueness constraints of an attribute (e.g., name, address, etc.) within the selected view, and are utilized to determine when an attribute is to be updated or created in the physical master data management system as described below. A business key for an attribute includes one or more fields that identify an attribute and provide uniqueness constraints for the selected view. For example, a business key for a person name attribute may be the name usage type, thereby providing one name per name type in the selected view. Alternatively, the business key may be name type, first name, last name, thereby providing more than one name per name type in the selected view if the first and last names are different.

In addition, the mapping may include transcoding functions to enable values of certain data within the virtual data model to be converted to compatible values within the physical data model for persistence of that data within the physical master data management system. For example, a gender attribute within the virtual data model may include values of 0 (e.g., indicating female) and 1 (e.g., indicating male), while a corresponding attribute of the physical data model may include values of 'F' (e.g., indicating female) and 'M' (e.g., indicating male). The transcoding function converts the values of 0 and 1 within the virtual data model to the corresponding compatible values within the physical data model of 'F' and 'M' for persistence of that attribute within the physical master data management system.

Since master data is generally stored in different data sources 150, the master data may be duplicated and inconsistent. Accordingly, data cleansing and standardization (e.g., provide a common format for data fields (e.g., date, time, etc.)) processes may further be specified, while a matching algorithm for associating member records of an entity may be defined and/or selected. The matching algorithm assists with de-duplication of data from the data sources. The virtual and physical data models, mapping, cleansing, standardization, and matching may be pre-configured into the plural architecture master data management system, or entered by a user via a user interface.

Source records from data sources 150 are loaded into the virtual master data management system (e.g., via virtual master data management system modules 161) and processed in accordance with the specified data cleansing and standardization at step 410. The source records are cross-matched at step 415 (e.g., via matching and linking engine 162) based on the specified matching algorithm to determine records associated with the same entity. Information linking member records to their associated entity is stored (without storing the actual record data). Various conventional and other matching or partial matching techniques may be employed (e.g., a quantity of the same or similar fields, matching scores, probabilistic matching, etc.).

The resulting entities are registered with the physical master data management system (e.g., via entity management module 190) at step 420 by persisting limited link information for the entities (e.g., information to map the entity between the physical and virtual master data management systems). The registration may be configured to ascertain link and other information from various sources. For example, link and other information may be obtained from a bulk cross matching process, or from the matching and linking entity management service performed by the virtual master data management system.

Once the entities are registered, the entities may be persisted to the physical master data management system (e.g., via services module 194 (e.g., persistEntity service)) at step 425 (e.g., as described below for FIG. 6). Since master data is generally stored in different data sources 150, the master data may be duplicated and inconsistent. Accordingly, several views of an entity (e.g., with varying data from data sources 150) may be generated by the virtual master data management system. A user may select a desired view via a user interface to provide a composite view to be persisted, or a generated view may be selected by the virtual master data management system via various criteria to provide the composite view for persistence.

Alternatively, the registration may be configured to persist entities. In this case, batch files are prepared, and may be submitted for processing either automatically as part of the registration or manually. The batch files include an entity identification and entity type, and may persist entities of a common or different entity types. In addition, rules may be applied to conditionally persist certain entities based on a set of criteria (e.g., completeness, data quality of created entity view, entity size (e.g., number of members or records in the entity), etc.).

Entities may be persisted in a registration mode or a full persistence mode. The information persisted for an entity in a registration mode includes the entity identification, entity type, data source identifiers, and member record identifiers. The data for the entity remains within data sources 150 and is retrieved by the virtual master data management system to generate the selected view. Full persistence mode maintains the persisted entity (e.g., entity attributes and member records) in the repository of the physical master data management system. Basically, the entity is converted to a corresponding business object (or party) of the physical data model based on the mappings for persistence in the physical master data management system.

Figure 5:
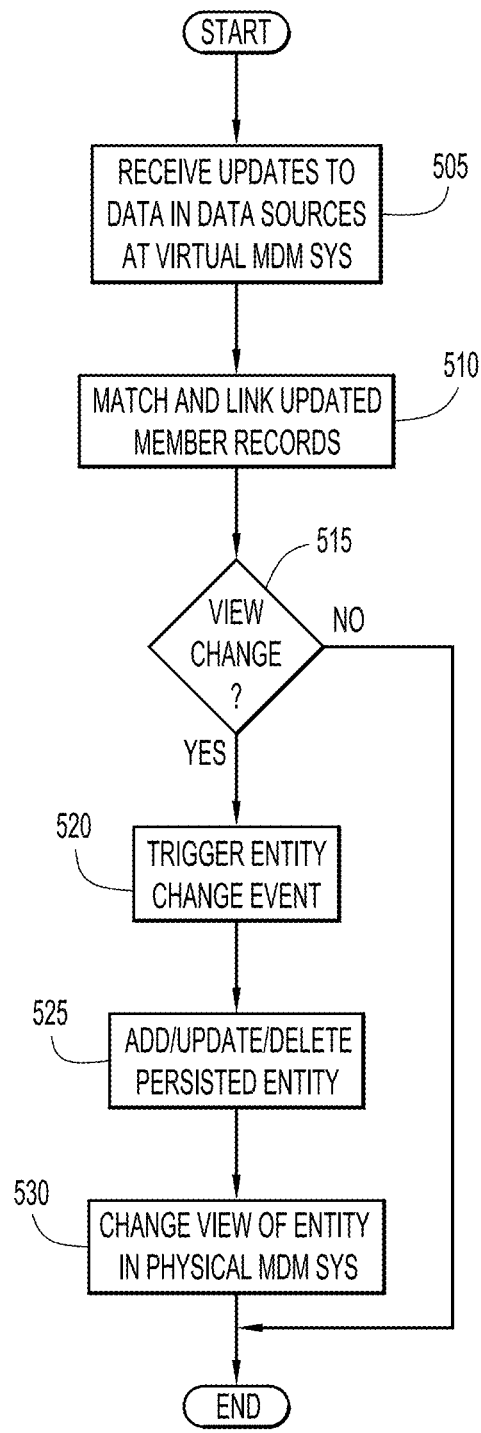
FIG. 5 is a procedural flow chart illustrating a manner in which modifications to data within data sources of a virtual master data management system are synchronized with data within a physical master data management system according to an embodiment of the present invention.

Once the desired entities are persisted in the physical master data management system, the plural architecture master data management system maintains data integrity of persisted entities with data in the virtual master data management system. This is accomplished by synchronizing modifications to data in the virtual master data management system with the persisted view of the entity in the physical master data management system. A manner of synchronizing data of the virtual master data management system with corresponding persisted entity views (e.g., via master data management server system 110 and virtual master data management system modules 161, physical master data management system modules 171, and entity management module 190) is illustrated in FIG. 5. Initially, the virtual master data management system receives data modifications (e.g., updates, additions, deletions, link alterations of records, etc.) at step 505. The modifications may include modifications (e.g., addition, deletion, updates, etc.) to data within data sources 150, and/or modifications to links of records forming an entity (e.g., a record of an entity may be modified to link the record with another entity). Matching and linking engine 162 matches and links records of the data sources at step 510 in order to determine if the selected view of the entity has changed (e.g., new or different member records, data within the member records has changed, etc.).

If the selected view has changed as determined at step 515, entity event notification module 192 triggers an entity change event at step 520.

The entity change event invokes services module 194 (e.g., persistEntity service) to add, update, or delete the persisted entity (or party) in accordance with the modification (e.g., modification to data or links of member records) at step 525. The business keys of an entity attribute may be utilized to determine the presence of new information for a corresponding attribute of the persisted entity (or party), or the presence of updated information for the corresponding attribute of the persisted entity (or party). The modified view (e.g., with the added, updated, or deleted information) is persisted in the physical master data management system at step 530 (e.g., as described below for FIG. 6).

Alternatively, rules may be applied to conditionally persist certain entities in response to an entity change event and based on a set of criteria (e.g., completeness, data quality of created entity view, entity size (e.g., number of members or records in the entity), etc.).

Figure 6:
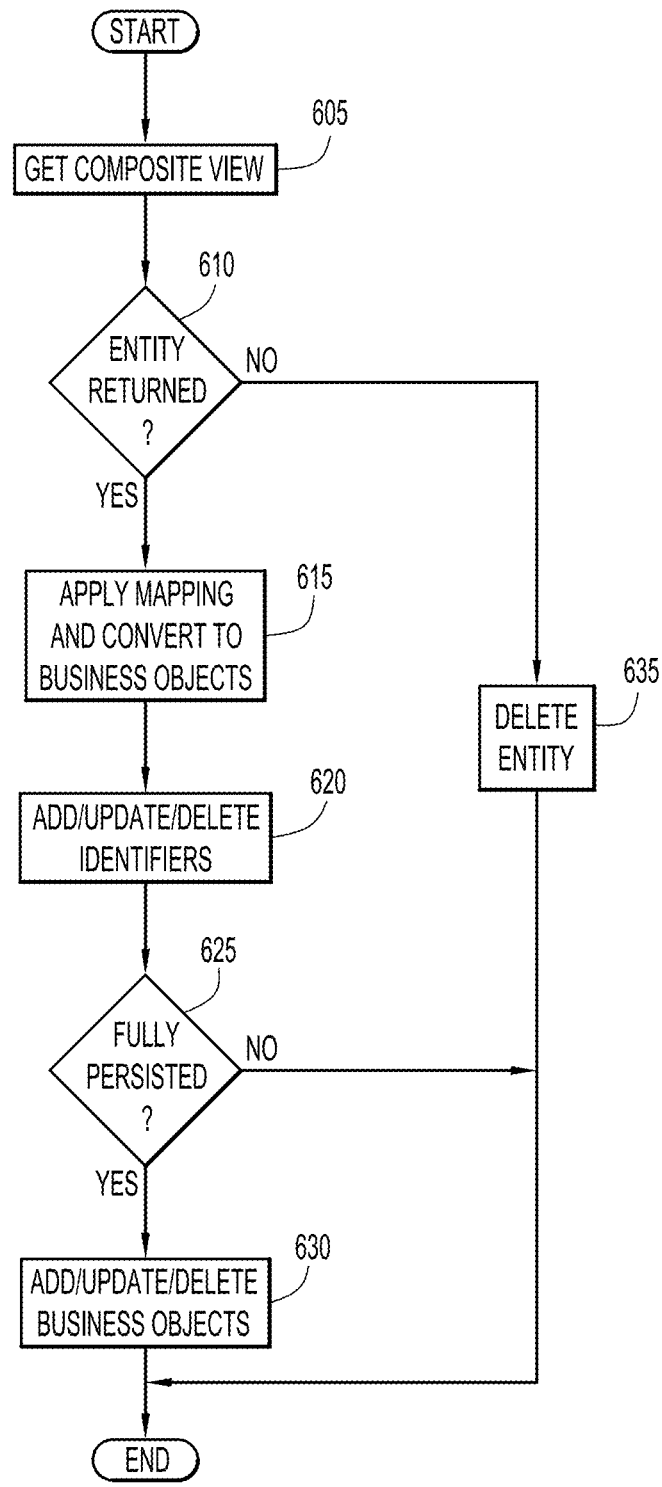
FIG. 6 is a procedural flow chart illustrating a manner of persisting data from a virtual master data management system to a physical master data management system according to an embodiment of the present invention.

A manner of persisting an entity to the physical master data management system (e.g., via master data management server system 110 and virtual master data management system modules 161, physical master data management system modules 171, and entity management module 190) is illustrated in FIG. 6. Initially, the selected (or composite) view for the entity is requested from the virtual master data management system at step 605. The selected view may represent a new entity (for persistence), or an existing (persisted) entity with modified data. The virtual master data management system typically generates the selected view for the entity on demand from data within data sources 150. This ensures the most recent data for persistence. The selected (or composite) view includes the business keys of the entity attributes, and is generated in accordance with the constraints of those business keys (e.g., indicating a quantity of unique data instances for an attribute, etc.). An internal service is utilized to determine the attributes of the entity in the virtual data model that correspond to business keys in the physical data model.

When no view is returned for the entity (e.g., a deleted or obsolete entity has been requested) as determined at step 610, the entity is deleted (e.g., via services module 194) at step 635. However, when the selected (or composite) view is returned for the entity, the mapping to the physical master data management system for the entity is applied (e.g., via entity management module 190) to convert the entity to the corresponding business object (or party) within the physical data model at step 615. In addition, transcoding functions within the mappings are applied to convert values within the virtual data model to compatible values within the physical data model.

The entity identification and corresponding member record identifiers are added, updated and/or deleted (e.g., registration persistence mode) within the physical master data management system (e.g., via services module 194 (e.g., persistEntity service)) in accordance with the action performed on the entity (e.g., add, modify, or delete an entity or corresponding attributes) at step 620. The action may be determined based on a comparison of the business keys of attributes for the entity and party within the virtual and physical master data management systems. For example, a new business key (not within the physical master data management system) may indicate addition of an attribute (and/or entity), while an existing business key value may indicate an attribute (and/or entity) update. Removal of the business keys may indicate deletion of the attribute and/or entity. The party identification may further be utilized to distinguish between actions for attributes and entities as a whole. The information for the entity within the virtual data model is updated within the converted business object (or party) (and corresponding party records of the database tables) of the physical data model indicated by the mappings.

When the entity is being fully persisted, the corresponding data of the entity is added, updated or deleted in the repository of the physical master data management system in accordance with the action performed on the entity (e.g., via services module 194 (e.g., persistEntity service)) at step 630. The action may be determined based on a comparison of the business keys of attributes for the entity and party within the virtual and physical master data management systems as described above. The information for the entity in the virtual data model is updated within the corresponding converted business object (or party) (and party records of the database tables) of the physical data model indicated by the mappings.

Figure 7:
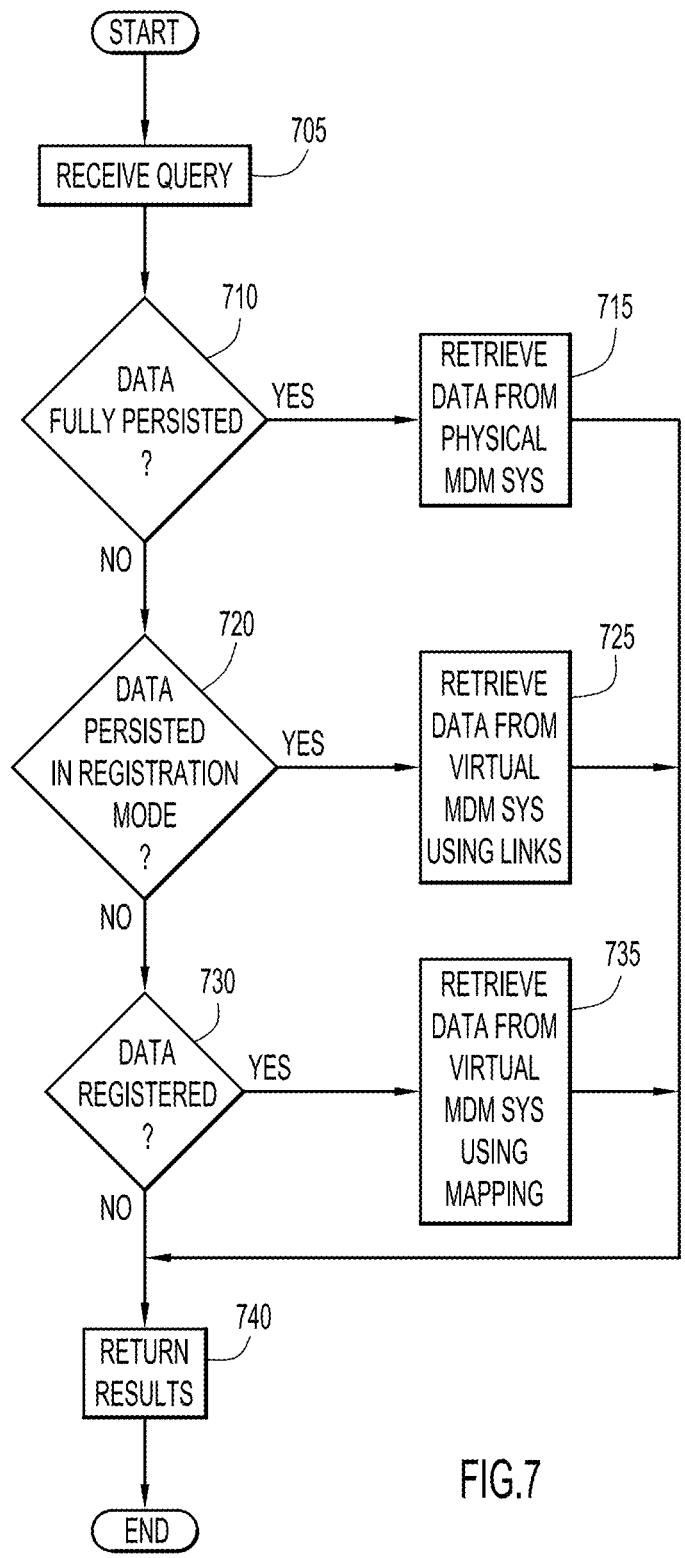
FIG. 7 is a procedural flow chart illustrating a manner of retrieving data from the plural architecture master data management system according to an embodiment of the present invention.

A manner of processing queries for entities within the plural architecture master data management system (e.g., via master data management server system 110 and virtual master data management system modules 161, physical master data management system modules 171, request processing framework 180, and entity management module 190) is illustrated in FIG. 7. Initially, a query for an entity is received by request processing framework 180 at step 705. The query is passed to services of services module 194 (e.g., getParty, getPerson, getOrganization, getPartyByAdminSysKey, getPartyByEntityId, etc.) to process the query. These services retrieve entities (e.g., person, organization, etc.) and/or parties within the virtual and/or physical master data management systems based on various criteria (e.g., entity or party identification, system keys, etc.). The entity is initially retrieved from the repository within the physical master data management system, and the status indicator is examined to determine the type of persistence. If the entity is fully persisted as determined at step 710, the entity data is retrieved from the repository of the physical master data management system at step 715, and the results are returned at step 740.

When the entity is persisted in the registration mode (e.g., the entity identification and member record identifiers are persisted) as determined at step 720, the entity data is retrieved from the virtual master data management system at step 725, and the results are returned at step 740. In this case, the virtual master data management system utilizes the entity identification and member record identifiers to generate the selected entity view from data retrieved from data sources 150.

When the entity is registered (and not persisted) in the physical master data management system as determined at step 730, the entity data is retrieved from the virtual master data management system at step 735, and the results are returned at step 740. In this case, the virtual master data management system utilizes the mapping between the virtual and physical master data management systems (e.g., mapping of entity and party identifications) to identify the corresponding entity within the virtual master data management system and generate the entity view from data retrieved from data sources 150.

It will be appreciated that the embodiments described above and illustrated in the drawings represent only a few of the many ways of implementing embodiments for plural architecture master data management.

The environment of the present invention embodiments may include any number of computer or other processing systems (e.g., client or end-user systems, server systems, etc.), data sources, and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, virtual master data management system modules, matching and linking engine, physical master data management system modules, request processing framework, entity management module, entity event notification module, services module, etc.). These systems may include any types of monitors and input devices (e.g., keyboard, mouse, voice recognition, etc.) to enter and/or view information.

It is to be understood that the software (e.g., virtual master data management system modules, matching and linking engine, physical master data management system modules, request processing framework, entity management module, entity event notification module, services module, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., virtual master data management system modules, matching and linking engine, physical master data management system modules, request processing framework, entity management module, entity event notification module, services module, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other data sources, databases, data stores, or storage structures (e.g., files, databases, data structures, data or other repositories, etc.) to store information (e.g., master or other data, mappings, persisted entities, virtual and physical data models, linking information, views, etc.). The data sources and database system may be implemented by any number of any conventional or other databases, data stores or storage structures (e.g., files, databases, data structures, data or other repositories, etc.) to store information (e.g., master or other data, mappings, persisted entities, virtual and physical data models, linking information, views, etc.). The database system may be included within or coupled to the server and/or client systems. The data sources, database systems, and/or storage structures may be remote from or local to the computer or other processing systems, and may store any desired data.

The plural architecture master data management system may include any quantity of any conventional or other types of data management systems employing any suitable management approaches (e.g., registry or virtual, centralized or physical, etc.). Any quantity of entities may be maintained in the data management systems, either solely in an individual system, or jointly in any combinations of the systems. Further, the data management systems may be queried for information individually to retrieve information from that individual system, or to retrieve information in a collective fashion (e.g., retrieve information from a plurality of the data management systems from a single query, etc.).

The virtual master data management system may produce any quantity of any types of views of an entity based on any desired criteria (e.g., uniqueness constraints, data types, etc.) for selection (e.g., manually by a user, automatically based on any desired criteria, etc.). Further, any quantity of the views may be persisted to the physical master data management system.

The virtual and physical data models may include any quantity of any suitable structures to accommodate the data of an application. The virtual and physical data models may be mapped in any desired fashion, where any desired information may be utilized to indicate the mappings (e.g., pointers, foreign or other database table keys, etc.). Further, the virtual and physical data models may be implemented by any quantity of any desired data or storage structures (e.g., database tables or objects, lists or arrays, queues, etc.).

The repository of the physical master data management system may be implemented by any number of any conventional or other databases, data stores or storage structures (e.g., files, databases, data structures, data or other repositories, etc.) to store information (e.g., persisted entities or parties, etc.). The information for the parties may be stored within any quantity of any desired data or storage structures (e.g., database tables or objects, lists or arrays, queues, etc.). The entity and party identifications may include any quantity of any types of characters, numbers and/or symbols to uniquely identify a party or identity. The party identification may be generated in any fashion (e.g., based on an entity identification, an independent formula or algorithm, sequential or other numbering, etc.). Further, the member record identifiers may include any quantity of any types of characters, numbers, and/or symbols to uniquely identify a record within the data sources. The status indicator may include any desired values and indicate any quantity of any types of states (e.g., registration mode, full persistence mode, etc.). The values may be assigned to the states in any fashion.

The synchronization may persist any desired modifications between the virtual master data management system and the physical master data management system (e.g., modification to data in the data sources, modification to links of records for an entity, modification to data in the physical master data management system, etc.). The modifications may be detected in any fashion (e.g., comparisons of: data, the selected view, member record links, business keys, etc.), where an entity may include any quantity of business or other keys each including any quantity of any fields of an attribute. The notification may be of any type or format, and include any type of indication (e.g., alert, alarm, data, etc.) to indicate the occurrence of the event. The persistence of data may be initiated manually (e.g., by a user, etc.) or automatically and may occur in response to the event or other condition, where any desired rules or criteria may be utilized to control the automatic persistence (e.g., size of entity, completeness of data, etc.).

The names of the services to persist and retrieve information as used herein are by example only, where the services may include any desired labels or names and may retrieve information based on any desired criteria (e.g., keys, identifiers, entity names or other attributes, etc.). The registration persistence mode may persist any desired information pertaining to the entity (e.g., record or other identifiers, identifications, etc.), where the information may include any portion of the entity data. Further, the full persistence mode may persist any desired information pertaining to the entity (e.g., record or other identifiers, identifications, etc.), where the information may include the entirety or any portion of the entity data.

The present invention embodiments may employ any number of any type of user interface (e.g., Graphical User Interface (GUI), command-line, prompt, etc.) for obtaining or providing information (e.g., queries, query results, configuration information, selections, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may employ any quantity of any types of data management systems to be utilized for management of any types of data corresponding to any objects (e.g., entities, animate or inanimate objects, etc.). The entities may represent any desired corporate, business, legal, personal, or other entities (e.g., person, corporation, company, organization, business, animate or inanimate object, etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible systems of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative systems, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method of managing data within a plurality of data management architectures comprising:
   persisting an entity managed by a first data management architecture to a second data management architecture, wherein the first data management architecture maintains data of entities across a plurality of different data sources and links data of the plurality of different data sources associated with a same entity to construct an entity view, wherein the second data management architecture manages entities by persisting data of the entity view from the plurality of different data sources within a common repository;
   persisting a set of identifiers for the entity within the common repository of the second data management architecture;
   detecting a modification to data of the persisted entity within the plurality of different data sources of the first data management architecture; and
   synchronizing the modified data of the persisted entity in the plurality of different data sources of the first data management architecture with data of the persisted entity in the common repository of the second data management architecture.

2. The computer-implemented method of claim 1, further comprising:
   retrieving the persisted entity by accessing the set of identifiers within the common repository of the second data management architecture and utilizing the set of identifiers to retrieve data of the persisted entity managed by the first data management architecture from the plurality of different data sources.

3. The computer-implemented method of claim 1, wherein persisting the entity further comprises:
   persisting data of the entity from the plurality of different data sources within the common repository of the second data management architecture.

4. The computer-implemented method of claim 3, further comprising:

retrieving the persisted entity by accessing the data of the entity within the common repository of the second data management architecture.

5. The computer-implemented method of claim 1, wherein persisting the entity further comprises:
generating a plurality of views of the entity within the first data management architecture, wherein each view includes a plurality of associated records from the plurality of different data sources; and
persisting a selected one of the views of the entity within the common repository of the second data management architecture.

6. The computer-implemented method of claim 1, wherein persisting the entity further comprises:
persisting the entity in response to the entity satisfying one or more criteria pertaining to data characteristics.

* * * * *